United States Patent [19]
Larsen et al.

[11] 3,988,410
[45] Oct. 26, 1976

[54] LUBRICANT FOR THE PRODUCTION OF NYLON AND POLYTETRAMETHYLENE TEREPHTHALATE NET-LIKE STRUCTURES

[75] Inventors: Ronald Leslie Larsen, Minneapolis; William Bela Haffner, Woodbury, both of Minn.

[73] Assignee: Conwed Corporation, St. Paul, Minn.

[22] Filed: Mar. 21, 1975

[21] Appl. No.: 560,817

Related U.S. Application Data

[63] Continuation of Ser. No. 404,234, Oct. 9, 1973, abandoned, which is a continuation of Ser. No. 292,656, Sept. 27, 1972, abandoned.

[52] U.S. Cl. .............................. 264/167; 156/167; 264/170; 264/211
[51] Int. Cl.² ............................................. D01D 5/20
[58] Field of Search ........... 264/167, 170, 211, 130, 264/DIG. 81; 260/857; 156/167

[56] References Cited
UNITED STATES PATENTS

| | | | |
|---|---|---|---|
| 3,366,721 | 1/1968 | Burdge | 264/130 |
| 3,423,503 | 1/1969 | York | 264/130 |
| 3,444,588 | 5/1969 | Martin et al. | 264/167 |
| 3,548,028 | 12/1970 | Itabashi et al. | 260/857 |
| 3,632,714 | 1/1972 | Fairbanks | 267/103 |
| 3,634,570 | 1/1972 | Himelreich et al. | 264/130 |
| 3,668,278 | 6/1972 | Boninichi et al. | 260/857 L |
| 3,689,617 | 9/1972 | Fairbanks | 264/167 |
| 3,725,518 | 4/1973 | Gaffney | 264/24 |
| 3,788,940 | 1/1974 | Ogata et al. | 161/173 |

*Primary Examiner*—Jay H. Woo
*Attorney, Agent, or Firm*—Eyre, Mann, Lucas & Just

[57] ABSTRACT

Lubricants for the production of net-like products from nylon and polytetramethylene terephthalate are disclosed. The lubricants comprise polyolefin with a specific melt index, said polyolefins being homopolymers of olefins or copolymers of two or more olefins.

5 Claims, No Drawings

LUBRICANT FOR THE PRODUCTION OF NYLON AND POLYTETRAMETHYLENE TEREPHTHALATE NET-LIKE STRUCTURES

The present application is a continuation of Ser. No. 404,234 filed Oct. 9, 1973 which in turn was a continuation of Ser. No. 292,656 filed Sept. 27, 1972, both of which are now abandoned.

The present invention relates to a new and useful process for the production of net-like products from nylon. With the process of the present invention, net-like products can be made from nylon which will have excellent properties in terms of separation of strands and other desirable characteristics.

The production of net-like products from polymers by melt extrusion is well known in the art and is taught for example in Galt, U.S. Pat. No. 3,384,692, Hureau, U.S. Pat. No. 3,252,181, Martin, U.S. Pat. No. 3,112,526, Gutierrez, U.S. Pat. No. 3,089,804, Tittmann, U.S. Pat. No. 3,178,328, Nalle, U.S. Pat. Nos. 3,019,147 and 3,118,180 and Mercer, U.S. Pat. No. 2,919,467. For purposes of the present invention, a net-like product is defined as a reticulated sheet of polymer, i.e., a sheet of polymer in which there are two sets of strands which intersect thus resulting in openings in the sheet of polymer.

Today, most net-like products made according to any of the various processes are made of polyethylene and polypropylene because of their good extrusion properties, tensile strength and other known advantages. It would be highly advantageous, however, to have net-like products of nylon since nylon has many unique properties which polypropylene and similar polymers do not have, including higher melting point, higher tensile strength, greater stiffness, better surface for paintability and adhesability and other known beneficial properties. The problem encountered with making nylon net-like products is that nylon is not easily extrudable in known net-like product fabricating equipment which are generally made for the extrusion of polyolefin polymers and the resulting nylon product is usually of poor structural conformation and relatively poor physical qualities. Frequently, the strands of nylon, which are supposed to be separate, join together to make an irregular sheet of polymer and this weakens the overall strength of the product.

Various attempts have been made to overcome this problem by the use of known nylon lubricants such as metal stearates, low molecular weight polyethylene, fluorocarbons, and similar known lubricants. However, whether these lubricants are applied internally or externally the results at best are sporadic, are usually unsatisfactory and are never consistent. Even with external lubricants such as silicones the results, while good initially, do not last for a commercially significant period of time and also have other known disadvantages, such as poor heat transfer, susceptibility to fouling, etc. It was therefore thought that as a practical matter it would not be feasible to produce net-like products of nylon.

The applicants have now discovered lubricants with which it is possible to produce nylon net-like products. The lubricants which the applicants have discovered to make it possible to produce nylon net-like products are polyolefins comprising homopolymers of olefins or copolymers of two or more olefins. Whether it is a homopolymer on a copolymer, the polyolefin according to the present invention must have a melt index measured by ASTM Test D 1238-70 Condition "E" of no greater than 100. Preferably, the melt index according to this test will be no greater than 25, more preferably the melt index will be no greater than 5, and best results have been obtained when the melt index according to this test is less than one. Suitable polyolefins include high molecular weight polyethylene (both low density and high density), high molecular weight polypropylene, polybutylene, polypentene, copolymers of these olefins such as ethylene-propylene copolymers and any other polyolefin having the necessary melt index as specified hereinbefore.

The lubricants of the present invention are useful for making net-like products from all types of nylon including, for example, nylon 6, nylon 6,10, nylon 6,13, nylon 11, nylon 12, nylon 13 and nylon 66 and have been found most useful for the production of net-like products from nylon 6 and nylon 66.

Not only has the lubricant been found useful on nylon but it has also been found useful in the production of net-like products from polytetramethylene terephthalate which has many of the same properties as nylon and is quite similar to nylon in problems encountered in the production of net-like products.

The amount of polyolefin lubricant to be used may be anywhere from about 1 to 10 per cent polyolefin by weight of nylon or polytetramethylene terephthalate. The polyolefin lubricant is somewhat effective as an external lubricant, i.e., a coating of the die metal directly by the polyolefin lubricant, but has been found to be far more effective as an internal lubricant, i.e., the polyolefin has been blended with the nylon resin. Best results are obtained when the polyolefin lubricant is integrally blended with the nylon, e.g., by pre-blending the polyolefin lubricant with the nylon resin before forming the usual nylon pellet. It is believed that the reason for this is that when the polyolefin is used as an external lubricant it is consumed in a rather short period of time whereas when it is used internally, it is present throughout the batch.

The following examples are illustrative of the improvement of the present invention. In the examples a square mesh net was made according to the teaching of Galt, U.S. Pat. No. 3,384,692 and Hureau, U.S. Pat. No. 3,252,181. In these patents, a plurality of longitudinal strands is extruded and a transverse strand is intermittently extruded integral with the longitudinal strands.

EXAMPLE 1

100 pounds of Ultramid B-5 (a nylon 6 resin available from BASF Corporation) was blended with 10 pounds of Amoco 1011 resin (polypropylene, available from Amoco Chemical Company) on a drum tumbler for 20 minutes. This blend was extruded at a temperature of 450°–480° F. into a net-like product having strands spaced one inch apart in both the longitudinal and transverse directions. The quality of the extruded net was excellent. When the blended material had been almost completely consumed, 25 pounds of straight Ultramid B-5 nylon resin was placed into the hopper. This straight resin originally resulted in good net since the blended material not yet purged from the system was acting as an external lubricant but, when the pure nylon purged out the blend, strand formation began to deteriorate and the strands stuck together resulting in a net of poor quality. Next a blend of 1¼ pounds of Amoco 1011 polypropylene and 50 pounds Ultramid B-5 nylon was added to the hopper and when this emerged from the die, an excellent net-like product was again obtained in which the strand formation was good and in which the transverse strands did not stick to each other. Amoco 1011 polypropylene has a melt index according to ASTM Test D 1238-70 Condition "E" of less than one.

EXAMPLE 2

A blend in the ratio of 100 pounds of Plaskon 8205 nylon and one pound of AC-540 low molecular weight polyethylene both available from Allied Chemical Company was prepared on a drum tumbler for 20 minutes. The AC-540 polyethylene has a melt index according to ASTM Test D 1238-70 Condition "E" of above 100. The blend was extruded at a temperature of 449° F. with net strands spaced one inch apart in both the machine and transverse directions. Net quality was poor since strand formation was poor and quite a number of the transverse strands stuck to each other. In addition, this blend caused severe fluctuations in the extruder output.

EXAMPLE 3

Example 2 was repeated except that USI Chemical Company's NA-107 brand high molecular weight polyethylene having a melt index according to ASTM Test D 1238-70 Condition "E" of less than 100 was substituted for the AC-540 brand polyethylene. In this case, net quality was acceptable with acceptable strand formation and with no undesirable quantity of transverse strands sticking to each other.

EXAMPLE 4

Polyethylene resin LB-733X (available from USI Chemical Company) a high density, high molecular weight polyethylene was blended in the ratio of 550 grams polyethylene to 100 pounds Ultramid B-5 nylon resin. The blend was extruded at a temperature of 458°–460° F. into a net with about 15 strands per inch in both the longitudinal and transverse directions. Net production was continued for a period of more than six hours and throughout this period net quality was good with both good strand formation and no undesirable sticking together of transverse strands. LB-733X has a melt index according to ASTM Test D 1238-70 Condition "E" of less than 25.

EXAMPLE 5

Example 4 is repeated except that an ethylenepropylene copolymer resin is used in place of the high molecular weight polyethylene. Comparable results are obtained.

EXAMPLE 6

Example 4 is repeated except that ethylene-hexene copolymer resin is used in place of the high molecular weight polyethylene. Comparable results are obtained.

EXAMPLE 7

Eastman Chemicals 6P20E, a high viscosity polytetramethylene terephthalate resin, was extruded at a temperature of from 534°–537° F. into a net of about 15 strands per inch. The extruded net product was originally acceptable, but after a period of about 25 minutes, the strand shape became unacceptable and the transverse strands stuck together resulting in a net of poor quality and forcing termination of the run.

EXAMPLE 8

Example 7 is repeated except that before extrusion, 100 pounds of the 6P20E polytetramethylene terephthalate resin was blended with 2 pounds of LB-742, a high density high molecular weight polyethylene available from USI Chemical Company and having a melt index according to ASTM Test D 1238-70 Condition "E" of less than 100. This blend was extruded for a period of more than one hour and throughout the run the quality of the extruded net was good and there was no undesirable sticking of the transverse strands.

EXAMPLE 9

Zytel 42, a high viscosity extrusion grade nylon 66 (available from DuPont) was extruded at a temperature of 530°–550° F. into a net with approximately 18 strands per inch in both the longitudinal and transverse directions. The net which was extruded began to deteriorate about 15 minutes after the straight nylon resin was introduced to the extruder, transverse direction strands became unevenly spaced and stuck together and their shape was poorly defined. Net quality was unacceptable. The run was terminated and the extruder and die were purged with polypropylene. A blend of 2 parts LB-742 (a high density polyethylene resin available from USI Chemicals) to 100 parts of Zytel 42 was admixed on a drum tumbler for 15 minutes and then extruded. The extrusion was continued for approximately 1 hour and 25 minutes and a 800 foot long roll of net of acceptable quality with good transverse strand formation was obtained.

It will be understood that the claims are intended to cover all changes and modifications of the preferred embodiments of the invention, herein chosen for the purpose of illustration, which do not constitute departures from the spirit and scope of the invention.

What is claimed is:

1. A process for the continuous extrusion of nylon through a metal die therefor to form products having at least in part a net structure, the nylon being selected from the group consisting of nylon 6, nylon 6, 10, nylon 6, 13, nylon 11, nylon 12, nylon 13 and nylon 66 or polytetramethylene terephthalate said process comprising:
   a. melt extruding a first plurality of spaced parallel strands of said polymer in molten state continuously through said metal die;
   b. melt extruding a second plurality of spaced parallel strands continuously through said metal die at an angle to the direction of extrusion of the first plurality of strands;
   c. each of said strands of said second plurality of spaced strands being joined to and connected with at least two of the spaced strands of the first plurality of strands at the crossing points in the net structure;
   d. lubricating selected portions of said die metal with a polyolefin comprising a homopolymer of an olefin or copolymer of two or more olefins with a melt index according to ASTM Test D 1238-70 Condition "E" of no greater than 100 in order to maintain the spacing between said strands between crossing points in the net structure by;
   e. blending with said strand polymer for at least one of said sets of plurality of spaced strands from about 1.0 to about 10.0% by weight of said polyolefin.

2. The improvement of claim 1 wherein the polyolefin has a melt index of not greater than 25.

3. The improvement of claim 1 wherein the polyolefin has a melt index of not greater than 5.

4. The improvement of claim 1 wherein the polyolefin has a melt index of not greater than one.

5. The improvement of claim 1 wherein the lubricant is polypropylene.

* * * * *